United States Patent
Shapira (10) Patent No.: US 10,608,999 B2
(45) Date of Patent: Mar. 31, 2020

(54) ESTABLISHING A SECURE UPLINK CHANNEL BY TRANSMITTING A SECRET WORD OVER A SECURE DOWNLINK CHANNEL

(71) Applicant: Celeno Communications (Israel) Ltd., Raanana (IL)

(72) Inventor: Nir Shapira, Raanana (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 204 days.

(21) Appl. No.: 15/822,249

(22) Filed: Nov. 27, 2017

(65) Prior Publication Data
US 2018/0167369 A1    Jun. 14, 2018

Related U.S. Application Data

(60) Provisional application No. 62/431,444, filed on Dec. 8, 2016.

(51) Int. Cl.
*H04L 29/06* (2006.01)
*H04B 7/06* (2006.01)
(Continued)

(52) U.S. Cl.
CPC .......... *H04L 63/0428* (2013.01); *H04B 7/06* (2013.01); *H04B 7/0617* (2013.01); *H04K 3/42* (2013.01);
(Continued)

(58) Field of Classification Search
CPC . H04L 63/0428; H04L 9/0656; H04L 9/0819; H04L 2209/80; H04W 12/1202;
(Continued)

(56) References Cited

U.S. PATENT DOCUMENTS

| 4,471,399 A | 9/1984 | Udren et al. |
| 6,272,640 B1 | 8/2001 | Sokol |

(Continued)

FOREIGN PATENT DOCUMENTS

| EP | 1804408 A1 | 7/2007 |
| WO | 2017/163160 A1 | 9/2017 |

OTHER PUBLICATIONS

Delaveau, François, et al. "Perspectives of physical layer security (physec) for the improvement of the subscriber privacy and communcation confidentiality at the air interface." Perspectives 27 (2016):28 (Year:2016).*

(Continued)

*Primary Examiner* — Yogesh Paliwal
(74) *Attorney, Agent, or Firm* — Kligler & Associates Patent Attorneys Ltd (57) ABSTRACT

An apparatus includes a Base Station (BS) that includes an antenna array and circuitry. The antenna array is configured to transmit downlink transmissions and to receive uplink transmissions. The circuitry is configured to generate secret bits to be used for securing uplink transmissions from legitimate user devices, and to distribute the secret bits over one or more data streams destined to the legitimate user devices, to further generate one or more jamming streams, and to apply to the jamming streams beamforming that directs the jamming streams away from the legitimate user devices, to transmit the data streams and the jamming streams using the antenna array, to receive, via the antenna array, data that was encrypted by a legitimate user device based on the secret bits, and to recover the data by decoding the encrypted data using the secret bits.

18 Claims, 4 Drawing Sheets

(51) Int. Cl.
| | |
|---|---|
| *H04L 9/06* | (2006.01) |
| *H04W 12/00* | (2009.01) |
| *H04W 12/12* | (2009.01) |
| *H04K 3/00* | (2006.01) |
| *H04L 9/08* | (2006.01) |
| *H04W 12/04* | (2009.01) |
| *H04W 12/02* | (2009.01) |

(52) U.S. Cl.
CPC ........... *H04K 3/825* (2013.01); *H04L 9/0656* (2013.01); *H04L 9/0819* (2013.01); *H04W 12/001* (2019.01); *H04W 12/04* (2013.01); *H04W 12/1202* (2019.01); *H04K 2203/16* (2013.01); *H04K 2203/18* (2013.01); *H04K 2203/32* (2013.01); *H04L 2209/80* (2013.01); *H04W 12/02* (2013.01); *H04W 12/04071* (2019.01); *H04W 12/12* (2013.01)

(58) Field of Classification Search
CPC .............. H04W 12/001; H04W 12/04; H04W 12/04071; H04W 12/02; H04W 12/12; H04B 7/06; H04B 7/0617; H04K 3/42; H04K 3/825; H04K 2203/16; H04K 2203/18; H04K 2203/32
See application file for complete search history.

(56) References Cited

U.S. PATENT DOCUMENTS

| | | | |
|---|---|---|---|
| 6,446,049 | B1 | 9/2002 | Janning et al. |
| 7,076,009 | B2 | 7/2006 | Wieck |
| 7,327,794 | B2 | 2/2008 | Fanson et al. |
| 7,616,704 | B2 | 11/2009 | Li et al. |
| 7,672,400 | B2 | 3/2010 | Shapira et al. |
| 7,751,353 | B2 | 7/2010 | Shapira et al. |
| 8,244,169 | B1 | 8/2012 | Dimartina et al. |
| 8,874,025 | B2 | 10/2014 | Shany et al. |
| 8,948,683 | B2 | 2/2015 | Shany et al. |
| 9,014,665 | B2 | 4/2015 | Shany et al. |
| 9,686,038 | B2 | 6/2017 | Shapira |
| 2005/0212660 | A1 | 9/2005 | Hansen et al. |
| 2007/0036353 | A1* | 2/2007 | Reznik ................. H04B 7/0434 380/30 |
| 2007/0155353 | A1 | 7/2007 | Shapira et al. |
| 2009/0097531 | A1 | 4/2009 | Franceschini et al. |
| 2009/0310572 | A1 | 12/2009 | Wang et al. |
| 2010/0166180 | A1 | 7/2010 | Steer et al. |
| 2015/0188662 | A1* | 7/2015 | Shapira ................. H04K 3/825 455/1 |

OTHER PUBLICATIONS

Borisov et al., "Intercepting Mobile Communications: The Insecurity of 802.11", Proceedings of the 7th Annual International Conference on Mobile Computing and Networking, pp. 180-189, Rome, Italy, Jul. 16-21, 2001.
Debbah et al., "Wireless physical layer security", EURASIP Journal on Wireless Communications and Networking, vol. 2009, article ID 404061, 2 pages, Dec. 31, 2009.
Tsai et al., "Effective-SNR Mapping for Modeling Frame Error Rates in Multiple-State Channels," 3GPP2, 16 pages, Apr. 29, 2003.
Kant et al. "Fast Link Adaptation for IEEE 802.11n", Master's thesis, The Faculty of Engineering and Science, Aalborg University,142 pages, Aug. 2007.
Goel et al., "Guaranteeing Secrecy using Artificial Noise," IEEE Transactions on Wireless Communications, vol. 7, issue 6, pp. 2180-2189, Jun. 2008.
Swindelhurst, A.L., "Fixed SINR Solutions for the MIMO Wiretap Channel," Proceedings of the International Conference on Acoustics, Speech and Signal Processing, pp. 2437-2440, Taipei, Taiwan, Apr. 2009.
IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", 536 pages, Oct. 29, 2009.
IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", IEEE Computer Society, 425 pages, 2013.
IEEE P802.11ax™/D2.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN—IEEE Computer Society, 596 pages, Oct. 2017.
European Application # 12749647.9 search report dated Dec. 13, 2017.
PHYLAWS—Project PHYLAWS (Id 317562) PHYsical LAyer Wireless Security Deliverable D.4.3, NETSEC upgrades of existing RATs—study report, Version 1.0, 74 pages, Nov. 23, 2015.
PHYLAWS—Project PHYLAWS (Id 317562) PHYsical LAyer Wireless Security Deliverable 5.1—WiFi Testbed Setup Development Report, Version 1.0 , 59 pages, Mar. 20, 2016.

* cited by examiner

ESTABLISHING A SECURE UPLINK CHANNEL BY TRANSMITTING A SECRET WORD OVER A SECURE DOWNLINK CHANNEL

CROSS-REFERENCE TO RELATED APPLICATIONS

This application claims the benefit of U.S. Provisional Patent Application 62/431,444, filed Dec. 8, 2016, whose disclosure is incorporated herein by reference.

TECHNICAL FIELD

Embodiments described herein relate generally to communication systems, and particularly to methods and systems for securing wireless communication.

BACKGROUND

Some wireless communication systems apply physical-layer (PHY) mechanisms for securing transmissions from illegitimate eavesdropping. For example, U.S. Pat. No. 9,014,665, whose disclosure is incorporated herein by reference, describes a method for communication that includes generating one or more data streams for transmission to respective target receivers, and one or more jamming streams. At least one parameter, selected from a group of parameters consisting of power ratios for allocation to the jamming streams and Modulation and Coding Schemes (MCSs) for assigning to the data streams, is calculated based on a criterion that is set to reduce a probability of the data streams being decoded by at least one eavesdropping receiver. The data streams and the jamming streams are transmitted using an antenna array while applying the at least one parameter.

Additional examples of secure transmission schemes are described, for example, by Goel and Negi, in "Guaranteeing Secrecy using Artificial Noise," IEEE Transactions on Wireless Communications, volume 7, no. 6, June, 2008, pages 2180-2189; and by Swindlehurst, in "Fixed SINR Solutions for the MIMO Wiretap Channel," Proceedings of the International Conference on Acoustics, Speech and Signal Processing, Taipei, Taiwan, April, 2009, pages 2437-2440.

SUMMARY

An embodiment that is described herein provides an apparatus, including a Base Station (BS) that includes an antenna array and circuitry. The antenna array is configured to transmit downlink transmissions and to receive uplink transmissions. The circuitry is configured to generate secret bits to be used for securing uplink transmissions from legitimate user devices, and to distribute the secret bits over one or more data streams destined to the legitimate user devices, to further generate one or more jamming streams, and to apply to the jamming streams beamforming that directs the jamming streams away from the legitimate user devices, to transmit the data streams and the jamming streams using the antenna array, to receive, via the antenna array, data that was encrypted by a legitimate user device based on the secret bits, and to recover the data by decoding the encrypted data using the secret bits.

In some embodiments, the apparatus includes a user device, which is configured to receive the data streams from the BS, to recover the secret bits from the data streams, to encrypt data intended to the BS using the recovered secret bits, and to transmit the encrypted data to the BS using one or more antennas. In other embodiments, the secret bits include a One Time Pad (OTP) bit-sequence, and the user device is configured to encrypt the data by applying a bitwise XOR operation between the data and the OTP bit-sequence. In yet another embodiment, the secret bits include a seed, and the user device is configured to use the seed for generating a pseudorandom sequence for encrypting the data using a stream cipher.

In an embodiment, the data intended to the BS includes a secret key, and the BS uses the secret key to encrypt information to be transmitted to the user device originating the secret key. In another embodiment, the BS is configured to generate updated secret bits and to transmit the updated secret bits to the user device over the data streams, and the user device is configured to recover the updated secret bits from the data streams, and to encrypt subsequent data intended to the BS using the updated secret bits. In yet another embodiment, the circuitry is configured to encode the secret bits using a Secrecy Coding (SC) scheme.

In some embodiments, the SC scheme includes an outer code followed by an inner code that includes a Forward Error Correction (FEC) code. In other embodiments, the outer code includes a Polar code or a Reed Muller code. In yet other embodiments, the circuitry is configured to estimate a number of secret bits required for securing uplink transmissions of a legitimate user device, by receiving from the legitimate user device a Buffer Status Report (BSR) that indicates a status of an outgoing queue of the legitimate user device.

There is additionally provided, in accordance with an embodiment that is described herein, a method for communication, including, in a Base Station (BS) that includes an antenna array, generating secret bits to be used for securing uplink transmissions from legitimate user devices, and distributing the secret bits over one or more data streams destined to the legitimate user devices. One or more jamming streams are generated, and beamforming that directs the jamming streams away from the legitimate user devices is applied to the jamming streams. The data streams and the jamming streams are transmitted using the antenna array. Data that was encrypted by a legitimate user device based on the secret bits is received via the antenna array, and the data is recovered by decoding the encrypted data using the secret bits.

These and other embodiments will be more fully understood from the following detailed description of the embodiments thereof, taken together with the drawings in which:

DETAILED DESCRIPTION OF EMBODIMENTS

Overview

Establishing secure wireless communication is challenging because an unauthorized eavesdropper may intercept transmissions of legitimate users over the air in an attempt to break the secrecy. In principle, wireless devices can establish secure communication using cryptographic keys generated from passwords previously agreed between the communicating parties. Password-based secrecy is considered insufficiently safe for certain applications, because passwords and information derived from passwords can leak or be otherwise exposed.

Consider a Base Station (BS) serving a user device in a wireless communication system. Transmissions from the BS to the user device are referred to as downlink transmissions, whereas transmissions from the user device to the BS are referred to as uplink transmissions. In a Wireless Local-Area Network (WALN) operating using WiFi technology, for example, the BS and user device are also respectively referred to as an Access Point (AP) and a station (STA).

Embodiments that are described herein comprise methods and systems for securing uplink transmissions in a wireless communication system, at the PHY-level. In the disclosed techniques, data sent in the uplink direction is encrypted based on secret bits transmitted securely in the downlink direction.

The AP typically comprises beamforming capabilities for achieving spatial selectivity in transmission, reception, or both. Using properly selected weights, the AP can transmit a signal in a desired direction, and/or create a spatial null in a certain direction, by transmitting the signal via multiple antennas simultaneously while applying the respective weights to the antennas (or to the underlying spatial streams).

In the disclosed techniques, the AP generates secret bits for securing uplink transmissions of legitimate user devices. The AP distributes the secret bits over one or more streams destined to the legitimate user devices. The AP additionally generates one or more jamming streams, and applies to the jamming streams beamforming that directs the jamming streams away from the legitimate user devices. The AP transmits the data streams and the jamming streams using the antenna array.

A legitimate user device receiving the data streams from the BS recovers the secret bits, and encrypts data intended to the BS using the recovered secret bits. The user device transmits the encrypted data to the BS using one or more antennas. The BS recovers the data by decrypting the encrypted data using its own copy of the secret bits.

The jamming streams typically carry random bits and no useful information. As such, the jamming streams appear to eavesdropper receivers as a high level noise. The technique of transmitting noise jamming streams is also referred to herein as Artificial Noise (AN) transmission.

Since the jamming streams are attenuated in the directions of legitimate user devices, the data streams are received at the legitimate user devices with a Signal to Noise Ratio (SNR) that is significantly higher than the SNR at the receiver of an illegitimate eavesdropper. This SNR advantage is also referred to as a Radio Advantage (RA). RA may be measured, for example, in db units.

In some embodiments, the AP divides its power budget between the data streams and the jamming streams so as to determine a desired RA level. Dividing the power budget to achieve a RA value above a predefined RA threshold results in (i) high probability of successful decoding of the data streams by legitimate users, and (ii) high probability of failing in decoding of the data streams by AN-interfered receivers.

The secret bits generated by the AP may comprise, for example, a One Time Pad (OTP) serving as a bit-sequence for stream ciphering. Alternatively, the secret bits may comprise a seed that is used for generating a pseudorandom bit-sequence for stream ciphering. In some embodiments, the AP occasionally generates and transmits to the user device updated secret bits for securing subsequent uplink transmissions.

In some embodiments, the user device sends to the BS a secret key encrypted using the secret bits. The BS then uses this secret key to encrypt downlink transmissions. This technique provides bidirectional cryptographic security.

In some embodiments, the downlink transmissions are further secured by applying to the data streams a suitable Secrecy Coding (SC) scheme, in addition to AN. In such embodiments, the AP encodes the data streams using a SC encoder, and the user device decodes the data streams using a SC decoder. Data transmitted over the downlink channel using both AN and SC is considered secured to a semantic security level.

In some embodiments, the SC scheme comprises an outer code followed by an inner code comprising a Forward Error Correction (FEC) code. The FEC may comprise, for example a Binary Convolutional Code (BCC) or a Low-Density Parity-Check (LDPC) code. The outer code may comprise, for example, a Polar code or a Reed-Muller (RM) code. Alternatively, any other suitable SC schemes can also be used.

System Description

Figure 1:
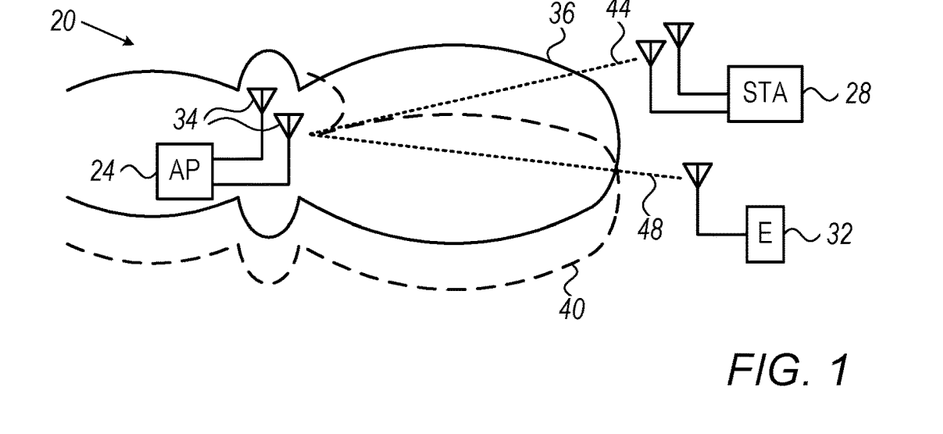
FIG. 1 is a block diagram that schematically illustrates a wireless communication system that uses physical-layer security, in accordance with an embodiment that is described herein.

FIG. 1 is a block diagram that schematically illustrates a wireless communication system 20 that uses physical-layer security, in accordance with an embodiment that is described herein. In the present example, communication system 20 comprises a Wireless Local Area Network (WLAN) that operates in accordance with IEEE Standard 802.11n, entitled "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput," October, 2009, which is incorporated herein by reference. In alternative embodiments, however, communication system 20 may operate in accordance with any other suitable communication standard or protocol, such as, for example Long Term Evolution (LTE).

Aspects of high throughput WLAN are specified, for example in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013, which is incorporated herein by reference.

Communication system 20 comprises an Access Point (AP) 24, which communicates with one or more stations (STA) 28. STA 28 is also referred to as a "user device" or a "client device." communication system 20 applies PHY-level security techniques, which are described in detail below, to prevent transmissions of AP 24 from being illegitimately decoded by an eavesdropper receiver 32. Eavesdropper receiver 32 is referred to herein as "eavesdropper" for brevity. The figure shows a single AP, a single STA and a single eavesdropper for the sake of clarity. Real-life systems, however, typically comprise multiple APs 24 and multiple STAs 28, and may be subject to eavesdropping by multiple eavesdroppers 32. STAs 28, to which the data streams are addressed by the AP, are also referred to as legitimate STAs, legitimate receivers or target receivers.

AP 24 comprises multiple antennas 34. Antennas 34 are sometimes referred to as a beamforming array, although the beamforming operation is typically performed on the signals that are provided to the antennas. The AP typically transmits one or more beam-formed data transmissions, referred to as data streams, on directional transmission beams that are directed toward the STAs intended to receive the data streams. In some scenarios, the AP may transmit the data streams without applying beamforming, or by applying beamforming selectively to only parts of the data streams.

In order to transmit a data stream to a given STA, the AP generates the signal to be transmitted, and transmits the signal simultaneously via multiple antennas 34 while applying a respective (complex) weight to each antenna. The set of weights, referred to as a beamforming vector, is selected so as to produce a directional beam that is directed toward the given STA. In the present example, AP 24 transmits a data stream to STA 28 using a beamforming vector that produces a beam 36.

In many practical scenarios, as in the example of FIG. 1, eavesdropper 32 is positioned at a location that enables it to receive beam 36 with sufficient Signal to Noise Ratio (SNR) so as to decode the data stream successfully. In order to secure the data stream, AP 24 uses the array of antennas 34 to transmit an additional stream, referred to as a jamming stream. The jamming stream is transmitted beam-formed with appropriate power and beamforming vector, which are set so as to (i) degrade the SNR at which eavesdropper 32 receives the data stream, and (ii) cause little or no SNR degradation at STA 28.

In the present context, the terms "jamming stream" and "jamming transmission" are used to describe any transmission that is not intended to convey useful data to any receiver, but rather to degrade the reception quality (e.g., SNR) at potential eavesdropping receivers. The terms SNR and Signal to Interference and Noise Ratio—SINR—are used interchangeably unless noted otherwise. Both terms refer to the power ratio between the data stream in question and the remaining signal and noise components, e.g., other data streams, jamming streams, and noise.

In the present example, the jamming stream is transmitted on a beam 40. As can be seen in the figure, the beamforming vector used for the jamming stream causes a spatial null in a direction 44 from AP 24 to STA 28, meaning that STA 28 will receive the jamming stream at a low power level that will cause little or no degradation to the decoding of the data stream carried on beam 36. Eavesdropper 32, on the other hand, is located at a direction 48 from the AP. Therefore, the eavesdropper will receive the jamming stream (beam 40) at a relatively high power level, which is comparable with that of the data stream (beam 36). As a result, the SNR of the data stream at eavesdropper 32 is poor, and there is high likelihood that the eavesdropper will fail to decode it.

In some embodiments, the jamming stream comprises a random or pseudorandom, noise-like signal. In other embodiments, the jamming stream comprises a sequence of modulated symbols that are selected at random from some symbol constellation, e.g., the same constellation used for modulating the data streams. In other embodiments, the jamming stream comprises a sequence of modulated symbols that are selected from a symbol constellation by Forward Error Correction Code (FEC) encoding and modulation of random bits. Further alternatively, the jamming stream may comprise any other suitable signal type.

FIG. 1 shows only a single data stream and a single jamming stream, for the sake of clarity. In alternative embodiments, AP 24 may transmit any desired number of data streams and any desired number of jamming streams simultaneously. Further alternatively, the jamming streams may be transmitted by a transmitter other than AP 24. Additional aspects of secure transmission schemes using jamming streams are addressed in U.S. Pat. Nos. 7,672,400 and 7,751,353, whose disclosures are incorporated herein by reference.

In some embodiments, AP 24 applies to the data stream a suitable Secrecy Coding (SC) scheme. The SC scheme may comprise, for example, an outer code followed by an inner FEC code. Sometimes, the inner coding is referred to as channel coding, and only the outer coding is referred to as Secrecy Coding. Note that the FEC is typically native to the underlying protocol (e.g., IEEE 802.11 family of standards). Using the SC scheme, the AP transmissions to STA 28 can be tuned (in terms of transmission power) to achieve semantic security. Semantic security means that given a secrecy encoded message it would be theoretically infeasible to extract any additional information on the message.

It can be shown that when the radio advantage of STA over eavesdropper 32 exceeds a predefined RA level, the signal encoded using the SC scheme and transmitted from the AP to the STA would be picked up at the eavesdropper receiver with BER close to 50%, in which case semantic security is guaranteed.

To achieve a significant radio advantage, the AP transmits jamming streams with beamforming that creates a spatial null in the direction of the STA. The AP typically divides its power budget between the jamming streams, which limits the power available for data transmission. In addition, some power of the jamming streams transmission is nevertheless received at the STA antennas, which interferes with the STA receiver. For these reasons, the transmission of the jamming streams reduces the maximal data rate at which the data streams can be decoded reliably by the STA receiver. In certain applications that require low bandwidth, e.g., banking and Internet of Things (IoT) this data rate limitation is of no practical concern.

Figure 2:
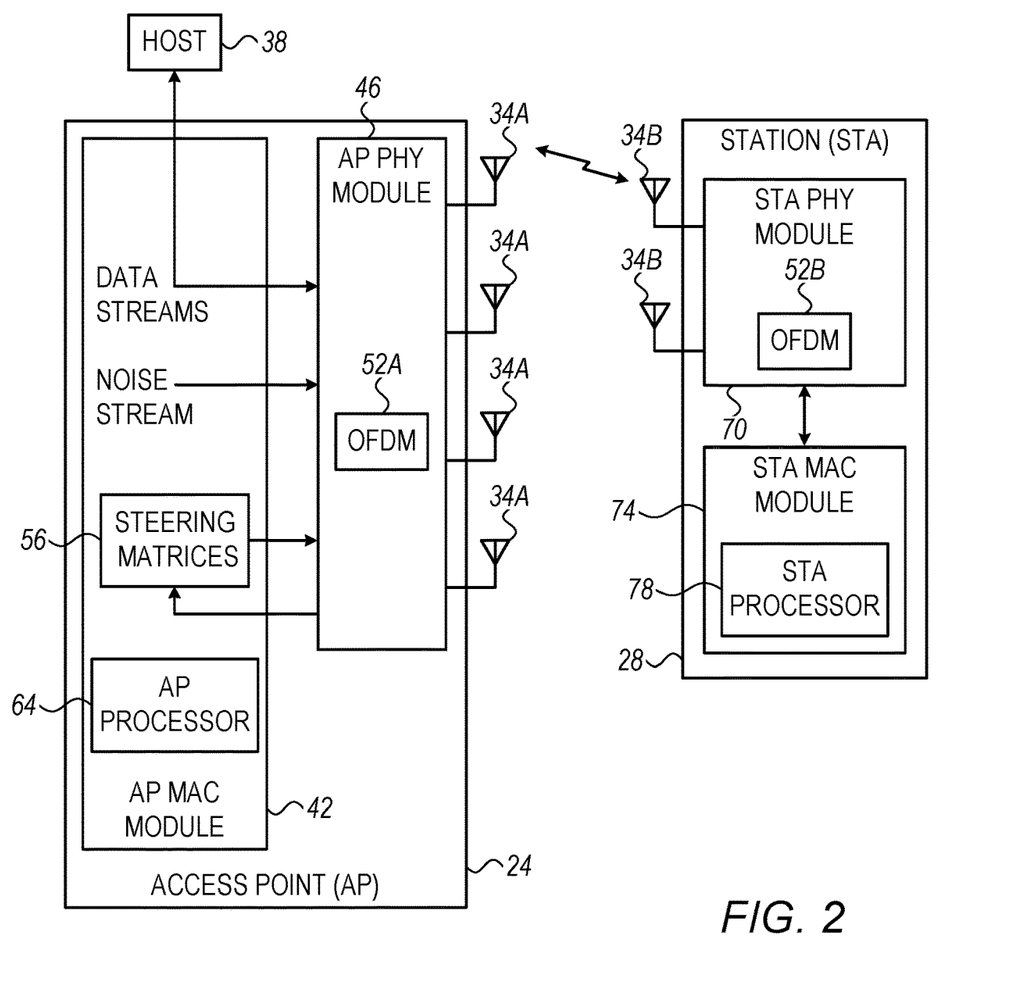
FIG. 2 is a block diagrams that schematically illustrates an access point (AP) and a station (STA) operating in the wireless communication system of FIG. 1, in accordance with embodiments that are described herein.

FIG. 2 is a block diagrams that schematically illustrates access point (AP) 24 and station (STA) 28 operating in the wireless communication system 20 of FIG. 1, in accordance with embodiments that are described herein.

In FIG. 2, AP 24 comprises multiple AP antennas 34A, and STA 28 comprises one or more STA antennas 34B. Typically, AP 24 comprises a larger number of antennas compared to STA 28. In the downlink direction (DL), AP antennas 34A function as transmit antennas and STA antennas 34B function as receive antennas. In the uplink direction (UL), STA antennas 34B function as transmit antennas and AP antennas 34A function as receive antennas. In the present example, AP 24 comprises four antennas, and STA 28 comprises two antennas. In alternative embodiments, however, AP 24 and STA 28 may comprise any other suitable number of antennas 34A and 34B, respectively. For example, STA 28 may comprise a single STA antenna 34B.

AP 24 transmits one or more spatial streams to STA via transmit antennas 34A. In practice, AP 24 communicates with multiple STAs, in which case AP 24 transmits one or more spatial streams to each of the STAs via antennas 34A. The spatial streams may be provided by an external host computer 38, or generated internally within AP 24. The spatial streams may comprise "data streams" that carry user data, control messages, and the like. AP 24 may additionally transmit a noise stream via antennas 34A (or multiple noise streams) that carries no useful information and uses for jamming potential eavesdroppers such as eavesdropper 32 of FIG. 1. AP 24 comprises an AP Medium Access Control (MAC) module 42 and an AP Physical-Layer (PHY) module 46. AP MAC module 42 comprises a steering matrix manager 56 and an AP processor 64.

AP processor 64 carries out various tasks of the AP MAC module such as controlling and scheduling the transmissions and receptions via the AP PHY module. In the downlink direction, AP PHY module 46 processes the spatial streams for transmission via transmit antennas 34A. In the example of communication system 20, the AP PHY module applies beamforming to one or more of the spatial streams (e.g., to the noise stream), and modulates the spatial streams using an orthogonal frequency-division multiplexing (OFDM) modem 52A. The AP PHY module maps bits in the spatial streams to symbols, e.g., in accordance with a Quadrature-Amplitude Modulation (QAM) scheme, and further maps the symbols to multiple sub-carriers in the frequency domain.

In the uplink direction, AP PHY module 46 receives uplink transmissions from one or more client devices such as STA 28, and demodulates these uplink transmissions to extract information sent from the client devices to the AP.

Steering matrix manager 56 controls the usage of steering matrices, which the AP PHY module generates and uses for applying beamforming to the spatial streams. A steering matrix defines (typically complexed valued) weights to be applied to the spatial streams. Each element of steering matrix specifies the beamforming weight applied to the signal of a particular spatial stream when transmitted via a particular transmit antenna. In OFDM based systems such as communication system 20, steering matrix manager 56 provides for each client device and for each of the OFDM sub-carriers a dedicated respective steering matrix. In some embodiments, AP PHY module 46 generates steering matrices based on feedback information that client devices transmit in response to a sounding frame.

In some embodiments, AP 24 generates secret bits and transmits these secret bits to STA 28 in the downlink direction over one or more spatial streams. The STA uses the secret bits to encrypt data transmitted in the uplink direction to the AP. Several example schemes for generating and updating the secret bits will be described in detail below.

STA 28 comprises a STA PHY module 70 and a STA MAC module 74. In the downlink direction, STA 28 receives via antennas 34B signals transmitted by AP 24. In the present example, STA PHY module 70 recovers the OFDM symbols transmitted to this STA from the spatial streams received using an OFDM modem 52B. The STA PHY module estimates radio channels between the transmit antennas of the AP and the receive antennas of the STA, and uses these estimated channels for separating between the multiple spatial streams destined to the STA. An STA processor 78 decodes the separated spatial streams to recover the user data transmitted.

In the uplink direction, STA MAC module 74 generates data for transmission to the AP, and STA PHY module 70 modulates this data using OFDM modem 52B, and transmits the data to the AP using antennas 34B.

In some embodiments AP MAC module 42 of the AP encodes the data transmitted in the downlink direction based on a Secrecy Coding (SC) scheme, and STA MAC module 74 of the STA decodes data stream that were encoded using the SC scheme to recover the data transmitted. SC schemes that provide semantic security will be described in detail below. In some embodiments the AP selectively protects the data streams using the SC schemes. For example, the AP may protect using SC (in addition to AN) only the transmission of the secret bits.

The configurations of wireless communication system 20, AP 24 and user device 28 shown in FIGS. 1 and 2 are example configurations, which are chosen purely for the sake of conceptual clarity. In alternative embodiments, any other suitable communication system AP and user device configurations can be used.

The different elements of AP 24 and user device 28 may be implemented using suitable hardware, such as in one or more Application-Specific Integrated Circuits (ASICs) or Field-Programmable Gate Arrays (FPGAs). In some embodiments, some elements of AP 24 and user device 28, e.g., AP processor 64 and STA processor 78, can be implemented using software, or using a combination of hardware and software elements. Elements of AP 24 and user device 28 that are not mandatory for understanding of the disclosed techniques have been omitted from the figure for the sake of clarity.

In some embodiments, AP processor 64, STA processor 78, or both, are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory. AP processor 64 and STA processor 78 may be internal or external to the respective AP MAC module 42 or STA MAC module 74.

In the context of the present patent application and in the claims, the elements of AP 24 excluding antennas 34A are referred to collectively as "circuitry." In the example of FIG. 2, the circuitry comprises the elements of AP MAC module 42 including AP processor 64, and AP PHY module 46.

Establishing a Secured Uplink Channel

Figure 3:
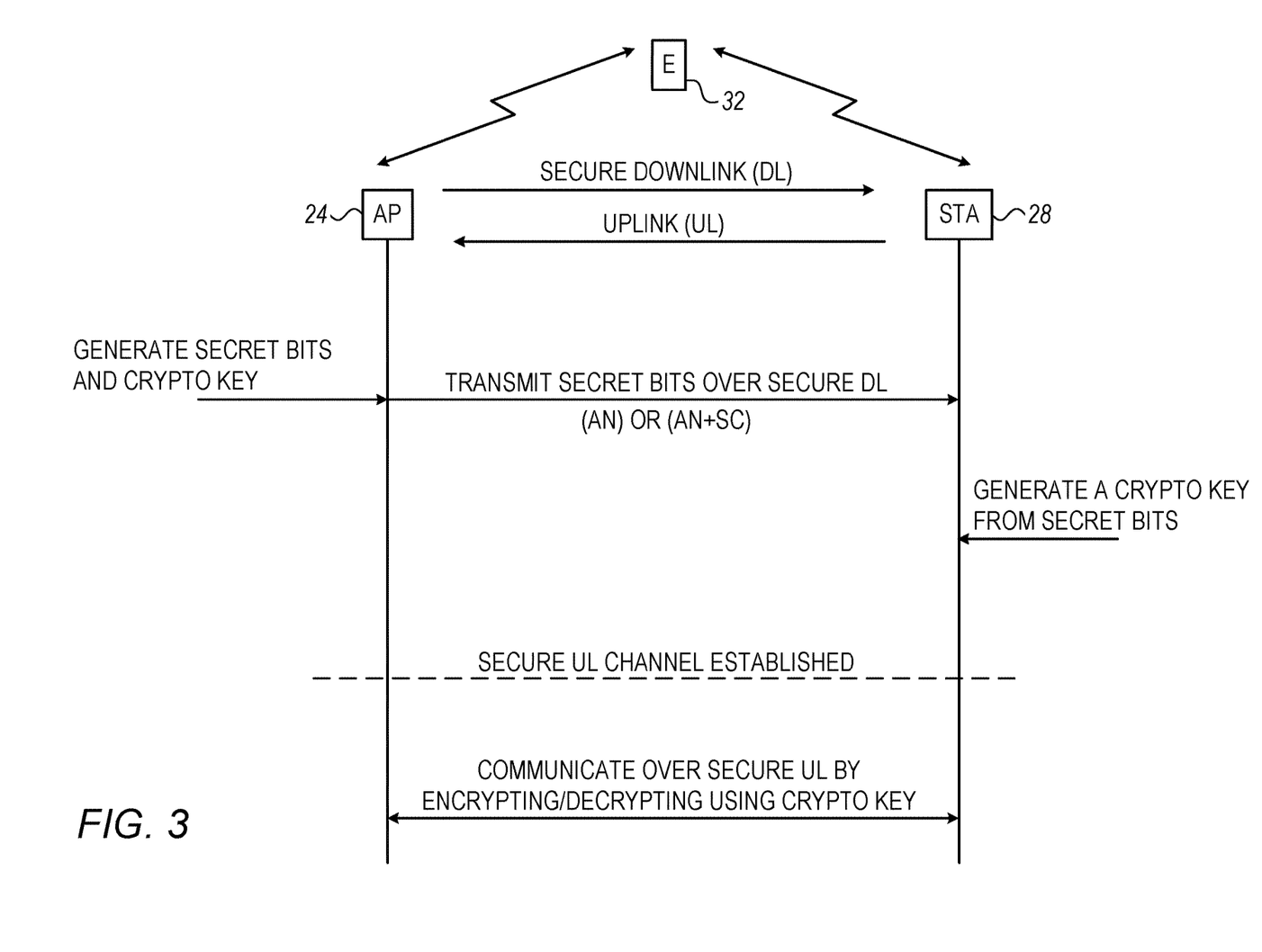
FIG. 3 is a block diagram that schematically illustrates a wireless communication system, in which wireless devices establish a secure uplink channel, in accordance with an embodiment that is described herein.

FIG. 3 is a block diagram that schematically illustrates a wireless communication system, in which wireless devices establish a secure uplink channel, in accordance with an embodiment that is described herein.

In FIG. 3, AP 24 transmits secret bits to STA 28 over a secure downlink channel. The downlink channel may be secured by the AP transmitting jamming streams. In addition, the downlink channel by be further secured by coding data streams transmitted using a Secrecy Coding (SC) scheme, as will be described in detail below. As such, eavesdropper 32 that picks up such a downlink transmission is unable to extract the secret bits from the downlink transmission. In some embodiments, the secret bits are generated by the AP to be used by the STA for securing uplink transmissions from the STA to the AP. The AP additionally generates random bits to be transmitted as Artificial Noise (AN) for interfering with signal reception at potential eavesdropper receivers. The AP distributes the secret bits over one or more data streams, and distributes the random bits over one or more jamming streams. In an embodiment, the AP generates from the secret bits a cryptographic key to be used for decrypting uplink transmissions received after establishing a secure uplink channel.

In the downlink transmission, the AP applies to the jamming streams beamforming so as to create a spatial null in the direction of the STA. The AP may additionally apply beamforming to the data streams for directing the data transmission mainly in the direction of the STA. The AP transmits the data streams bearing the secret bits, and the jamming streams bearing the random bits using antennas 34A. In some embodiments, in the downlink direction, the AP additionally encodes the secret bits using a suitable Secrecy Coding (SC) scheme, as will be described in detail below.

STA 28 receives the downlink transmission from the AP via antennas 34B and decodes the secret bits from the received data streams. The STA generates from the secret bits a cryptographic key that matches the cryptographic key at the AP. At this point, the STA has established a secure uplink channel toward the AP.

In some embodiments, securing the uplink channel is based on symmetric-key ciphering, in which case the AP and STA generate from the secret bits an identical cryptographic key. Alternatively, securing the uplink channel is based on asymmetric-key, in which case the STA and AP generate from the secret bits matching different keys for encryption at the STA side and for decryption at the AP side.

The STA communicates with the AP securely over the uplink channel by encrypting messages destined to the AP using the crypto key locally generated in the STA. In the present example, the AP uses the same cryptographic key to decrypt the encrypted uplink messages. Since eavesdropper 32 cannot decode the secret bits transmitted by the AP over the secure downlink channel, the eavesdropper has no knowledge of the crypto key and therefore cannot decipher messages transmitted from the STA to the AP over the secure uplink channel.

In an embodiment, the secret bits sent by the AP securely over the downlink channel comprise a seed. In this embodiment, the STA generates from the seed keystream bits, and encrypts uplink transmissions using the keystream bits as input to a stream cipher. In another embodiment, the AP generates the keystream bits locally, and sends the keystream bits over the secure downlink channel to the STA. In this embodiment, the AP typically sends a keystream bit per plaintext bit required for stream ciphering by the STA. Note that in using stream ciphering, both the cipher and decipher use the same keystream bits.

In some embodiments, the AP secures the downlink transmissions selectively. For example, the AP may transmit certain data over the downlink channel with no security applied. Alternatively, the AP may protect at least some of the downlink transmissions by transmitting AN with or without applying SC.

As noted above, using directional AN transmission, provides the STA with a radio advantage over potential eavesdroppers. Since the eavesdropper receives the downlink transmission together with the jamming streams, the eavesdropper picks up the AP downlink transmissions at a very low SNR, resulting in a Bit Error Rate (BER) of about 10%-30%. Such a high BER typically results when using FEC schemes such as LDPC, at very low SNR scenarios. In certain scenarios, such a BER may be sufficient for securing the downlink transmission. For example, when the secret bits comprise a 256-bit key, and assuming a BER of 10%, about 25 of the key bits are expected to be erroneous, at bit locations that are unknown to the eavesdropper. Breaking the secrecy of the key under such conditions is usually computationally impractical.

In some embodiments, in addition to transmitting the jamming streams, the AP encodes the data streams in accordance with a Secrecy Coding (SC) scheme. By using the SC scheme the BER at the eavesdropper receiver is increased to about 50%, i.e., providing for semantic security.

In some embodiments, protecting the secret bits using AN without applying an SC scheme is considered sufficiently secure. In such embodiments, the outer encoding part of the SC scheme can be omitted. This may be advantageous in high speed application for which SC should to be implemented in hardware.

In other embodiments, the AP applies SC in addition to AN only to the secret bits and not to other data transmitted in the downlink direction. In these embodiments, the SC encoder and SC decoder can be implemented in software, with no modifications to the underlying hardware. Implementing the SC scheme in software is possible, for example, when then number of secret bits is small, e.g. in case the secret bits comprise a key seed, or in case of using a relatively short keystream as determined by the expected number of uplink plaintext bits.

Figure 4:
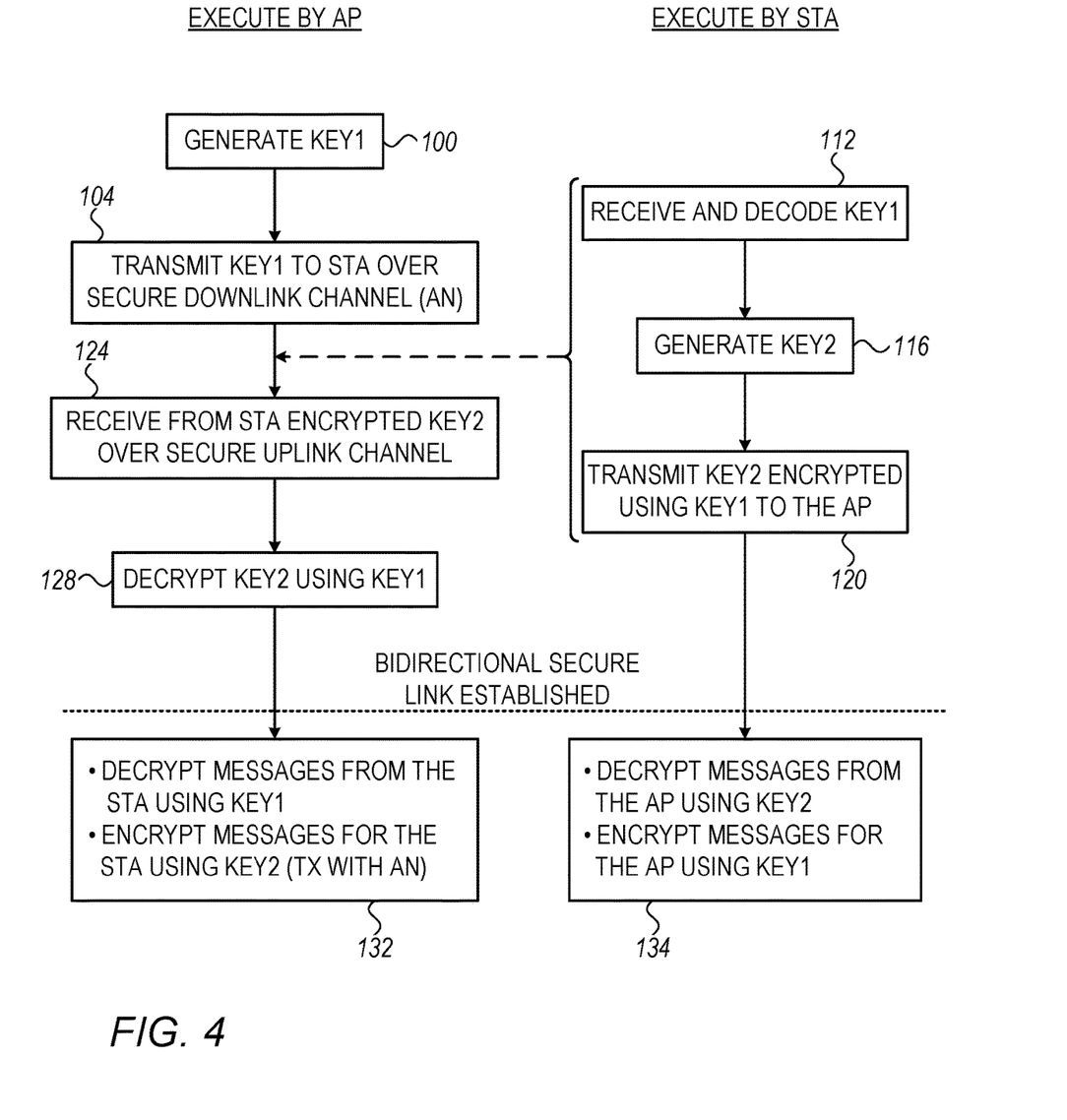
FIG. 4 is a flow chart that schematically illustrates a method for establishing a bidirectional secure wireless link, in accordance with an embodiment that is described herein.

FIG. 4 is a flow chart that schematically illustrates a method for establishing a bidirectional secure wireless link, in accordance with an embodiment that is described herein. The method will be described as executed jointly by AP 24 and STA 28.

In the present example, we assume that securing the uplink channel is based on stream ciphering. As such, the encrypting party, i.e., the STA for secured UL and the AP for secured DL, encrypts a message by applying a logical bitwise XOR operation between the message bits and a random (or pseudorandom) bit-sequence. The other party, i.e., the AP in secured UL and the STA in secured DL, decrypts the encrypted message by applying a logical bitwise XOR operation between the bits of the encrypted message and the same random bit-sequence that was used for encryption.

The method of FIG. 4 begins with AP MAC module 42 generating secret bits denoted KEY1, at a secret generation step 100. In some embodiments, secret bits KEY1 comprise a One Time Pad (OTP), and each of the AP and STA uses the OTP as a bit-sequence for stream ciphering. In other embodiments, secret bits KEY1 comprise a key that serves as a seed for generating a pseudorandom bit-sequence for the stream ciphers at each of the AP and STA. Policies for generating and updating the OTP and/or seed will be described in detail below.

At a downlink transmission step 104, the AP transmits secret bits KEY1 to the STA in a secured manner, by transmitting one or more jamming streams (AN) in conjunction with the data streams bearing the secret bits.

At a secret reception step 112, STA MAC module 74 receives the downlink transmission and decodes from this transmission secret bits KEY1. Note that using KEY1, the STA can communicate with the AP securely over the uplink channel.

At a STA key generation step 116, the STA MAC module locally generates other secret bits denoted KEY2. At an uplink KEY2 transmission step, the STA MAC module encrypts the bits of KEY2 using KEY1. For example, KEY1 itself serves as a bit-sequence for the stream cipher, or the STA uses KEY1 as a seed for generating a bit-sequence for stream ciphering at the STA. The STA then transmits the encrypted KEY2 to the AP, at a KEY2 transmission step 120.

At a KEY2 reception step 124, the AP receives the encrypted KEY2, and at a KEY2 decryption step 128, the AP MAC module recovers the KEY2 bits by decrypting the encrypted KEY2 using its local KEY1 bits. At this point the AP and STA have established a bidirectional secure link.

At an AP communication step 132, the AP receives via antennas 34A encrypted uplink messages from the STA, and the AP MAC module decrypts these uplink messages using KEY1. The AP MAC module additionally encrypts downlink messages destined to the STA using KEY2, and the AP transmits the encrypted downlink messages to the STA via antennas 34A.

In some embodiments, the AP transmits the encrypted downlink messages together with jamming streams (using AN). Such downlink transmissions are highly protected both by the jamming streams and by the cryptographic encryption using KEY2. Further alternatively, the AP may protect the downlink transmission at a semantic security level by additionally applying to the data streams a suitable SC scheme.

At an STA communication step 134, the STA receives via antennas 34B downlink messages from the AP, and the STA MAC module decrypts these downlink messages using KEY2. The STA MAC module additionally encrypts messages destined to the AP using KEY1, and the STA transmits the encrypted uplink messages to the AP via antennas 34B.

In some embodiments, in case of using a symmetrical encryption scheme, and because KEY1 is secured over the downlink direction, both the AP and STA can use KEY1 for encryption and decryption. As such, the scheme of FIG. 4 including KEY2 for encrypting downlink transmissions is not mandatory, and using only KEY1 may be considered sufficiently secure.

Managing the Secret Bits

Now we describe various considerations regarding stream ciphering based on OTP bits. In some embodiments, the AP receives from the STA a request for generating a OTP stream X-bit in length to be used for encrypting an X-bit message using a stream cipher. In response to the request, the AP generates a OTP comprising X bits, and transmits the OTP to the STA over the secured DL channel (e.g., step 104 above). The described protocol for requesting and receiving the OTP can be implemented in wireless devices comprising chipsets such as WLAN chipsets, for example, at the application layer, WLAN driver layer, or at the MAC layer.

In other embodiments, the AP estimates the number of OTP bits required for stream ciphering at the STA, by receiving from the STA a Buffer Status Report (BSR) that indicates the status of the outgoing queue of the STA. The AP generates a number of OTP bits (e.g., step 100 above) based on the BSR. BSR is specified, for example, in draft 2.0 of the IEEE P802.11ax™ specifications.

In yet other embodiments, the OTP bits are handled by the AP and STA in an opportunistic manner. For example, when the AP is free from other tasks, the AP generates some OTP bits, and sends these OTP bits to the STA (using AN, or using both AN and SC). Alternatively or additionally, the STA may occasionally request from the AP a required number of OTP bits. In these embodiments, the AP delivers OTP bits to the STA even when these OTP bits are not required for stream ciphering instantly, and the STA stores the unused received OPT bits for future ciphering. Assuming that the air medium has free time slots for sending OTP bits, the STA transmits secure uplink transmissions (e.g., step 134 above) with minimal or no latency because the OTP bits are available when needed.

In some embodiments, the wireless communication system supports scheduling downlink and uplink transmissions within a common TX opportunity (TXOP) interval. Such a frame exchange sequence is supported by the IEEE 802.11ax protocol and is referred to as a trigger based scheduling scheme. In these embodiments, the AP sends OTP bits to the STA and receives a message encrypted based on these OTP bits within the same TXOP. In an example embodiment, the AP and STA perform the following message exchange sequence:

1. The AP sends to the STA a suitable trigger frame for requesting a Buffer Status Report (BSR) from the STA. In accordance with the IEEE 802.11ax specifications, a trigger frame is any downlink frame that solicits an immediate uplink response by the STA.
2. In response the request, the STA transmits an updated BSR to the AP over one or more frames. The STA typically transmits the BSR over an unsecured uplink channel.
3. Based on the received BSR, the AP generates an estimated number of OTP bits needed by the STA stream cipher, and sends to the STA the OTP bits together with a trigger frame that schedules an uplink transmission. The AP transmits the OTP bits and the trigger frame over a secure downlink channel. The AP secures this downlink transmission using AN, or using both AN and SC.
4. The STA encrypts a message destined to the AP using the OTP bits received from the AP, and transmits the encrypted message to the AP within the same TXOP interval that contains the downlink transmission.

In the four-step sequence described above, adjacent frames are separated by a minimal Short Inter-Frame Space (SIFS) interval.

In some embodiments, instead of executing the four-step sequence described above for sending the OTP bits and receiving a respective encrypted message within the same TXOP interval, the AP and STA apply a protocol referred to as the Reverse Direction (RD) protocol, which is specified, for example in the 802.11n standard cited above.

Stream ciphering based on OTP requires the AP to send to the STA at least one OTP bit for each plaintext message bit to be encrypted. In alternative embodiments, stream ciphering is based on secret bits comprising a seed, which are typically more efficient than using OTP.

In some embodiments, the AP cyclically sends an updated seed to the STA. The STA uses the updated seed to generate a pseudorandom bit-sequence for encryption using the STA stream cipher. In some embodiments, the rate of updating the seed by the AP is configurable. The AP may update the seed in various ways. In one embodiment, the AP sends an updated seed per air access/transaction. In another embodiment, the AP sends an updated seed after receiving from the STA a predefined number of bits (over one or more uplink messages) that were encoded using the recently sent seed. In yet another embodiment, the AP sends to the STA an updated seed periodically at a predefined time interval. The AP may generate random seed instances using any suitable method.

In some embodiments, the AP generates a seed having a sufficiently large number of bits (e.g., 256 bits per seed instance), and the AP refreshes the seed at a sufficiently high rate, in which case the AP protects downlink transmission by transmitting jamming streams without SC. Such a protection scheme may cause a 10% or higher BER at the receiver of an eavesdropper, which provides sufficient level of security in some practical applications. This scheme, however, is not semantically secure in which close to 50% BER is required.

In alternative embodiments, the AP protects downlink transmissions containing seed bits using both AN and SC for maximal security, and protects other downlink transmission using only AN without SC. Since the amount of data involved in refreshing the seed is relatively small, the SC encoder at the AP and the SC decoder at the STA can be implemented in software, e.g., at an application layer, with acceptable complexity and latency.

In some embodiments, the AP and STA generate secret bits randomly. These random secret bits refer, for example, to OTP bits or seed bits sent from the AP to the STA and/or to a secret key sent from the STA to the AP. In some embodiments, the AP and STA generate random secret bits or keys based on Channel State Information (CSI). In an embodiment, the AP and STA exchange sounding frames for estimating the CSI corresponding to the wireless channel between them. In an embodiment, the AP transmits a sounding frame over the downlink channel protected by transmitting jamming streams.

The CSI itself is typically not exposed over the air, because it is typically private and unique for the AP to STA air channel. The CSI is therefore known to the participating AP and STA but not to any eavesdropper that may intercept the sounding frames. The AP and STA agree on the secret key generated locally by each of the AP and STA based the local CSI instance, and possibly by applying reconciliation techniques. Methods for generating keys based on CSI are described, for example in PCT International Publication WO 2017/163160, whose disclosure is incorporated herein by reference.

Secrecy Coding Schemes

As noted above, the AP can achieve semantic security over the downlink channel by applying to the data streams a suitable SC scheme.

Figure 5:
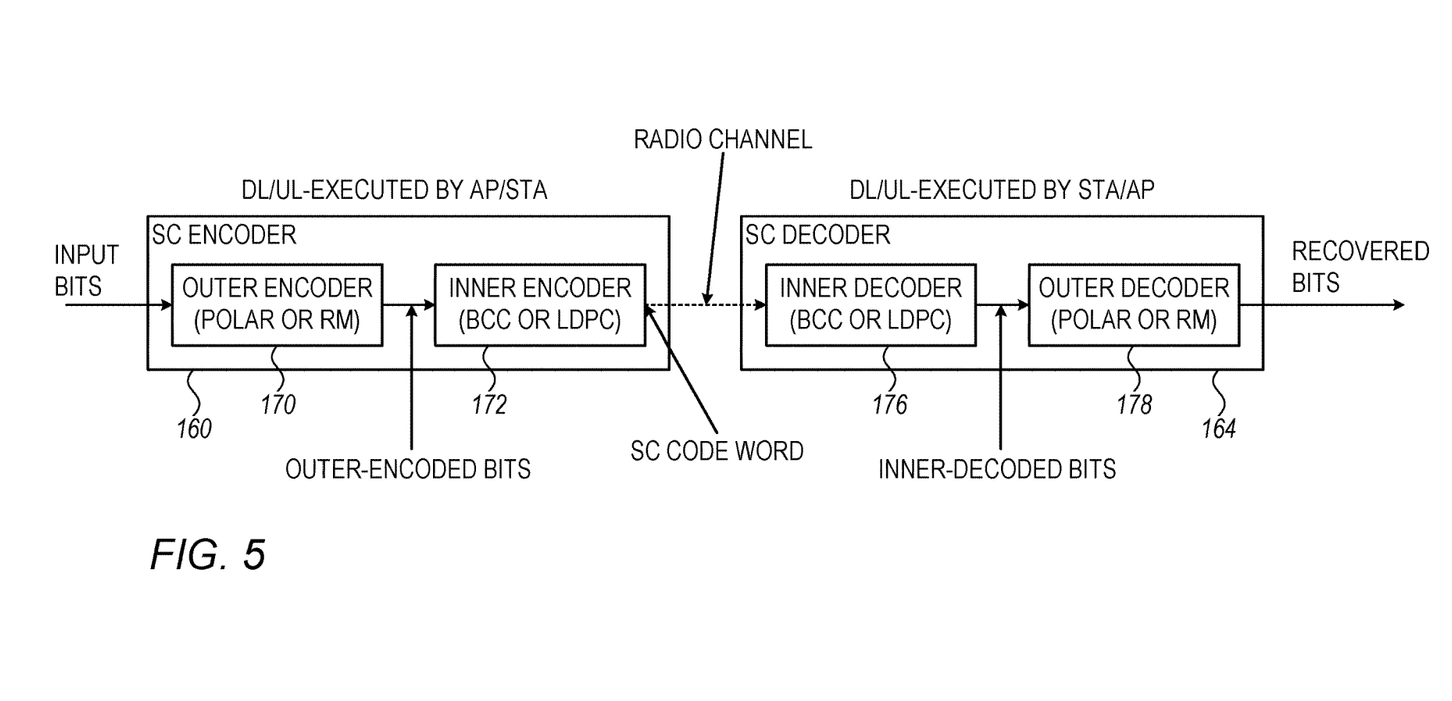
FIG. 5 is a block diagram that schematically illustrates a Secrecy Coding (SC) scheme, in accordance with an embodiment that is described herein.

FIG. 5 is a block diagram that schematically illustrates a Secrecy Coding (SC) scheme, in accordance with an embodiment that is described herein. The SC scheme comprises a SC encoder 160 and a SC decoder 164. In some embodiments, the SC encoder and SC decoder are executed by the relevant MAC module, e.g., AP MAC module 42 of AP 24, or STA MAC module 74 of STA 28 in FIG. 2 above. In the downlink direction, the AP MAC module executes the SC encoder part and the STA MAC module executes the SC decoder part. In the uplink direction, the STA MAC module executes the SC encoder part and the AP MAC module executes the SC decoder part.

In an example embodiment, the SC scheme is based on a concatenation of an inner code and an outer code. SC encoder 160 comprises an outer encoder 170 followed by an inner encoder 172. SC decoder 164 comprises an inner decoder 176 followed by an outer decoder 178.

In some embodiments, outer encoder 170 receives input bits, e.g., of a data stream to be transmitted, and encodes the input bits using an outer code. The outer encoder may use any suitable outer code, such as, for example, Polar code or a Reed Muller (RM) code. Inner encoder 172 receives outer-encoded bits from the outer encoder, and further encodes the outer-encoded bits using a suitable Forward Error Correction (FEC) code. In some embodiments, the FEC code comprises a Binary Convolutional Code (BCC) or a Low-Density Parity-Check (LDPC) code. The output of the inner encoder comprises a SC code word. In the downlink (uplink) direction, AP MAC module 42 (STA MAC module 74) sends the SC code word bits to AP PHY module 46 (STA PHY module 70) for transmission via antennas 34A (34B).

At the receiver side, the SC code word is typically received with one or more erroneous bits, which SC decoder 164 attempts to correct for recovering the input bits. The SC decoder first applies inner decoder 176 to the received code word to produce inner-decoded bits. The SC decoder then applies to the inner-decoded bits outer decoder 178 to recover the input bits.

In some embodiments, inner FEC encoding and decoding (i.e., inner encoder 172 and inner decoder 176) is supported by the underlying protocol of the wireless communication system. For example, the IEEE 802.11 specifications cited above support FEC coding using BCC and LDPC code. BCC is specified, for example in the IEEE standards 802.11a, 802.11g, 802.11n, 802.11ac and 802.11ax of the IEEE 802.11 family. LDPC is specified, for example, in the IEEE standards 802.11n, 802.11ac and 802.11ax of the IEEE 802.11 family. In some embodiments, the FEC encoder and decoder are implemented in hardware within commercial WiFi chipsets. In contrast, outer codes such as Polar and RM codes that are suitable for supporting the full data rate requirements in modern WLANs, are typically complex to implement in hardware.

In some embodiments, the application layer/driver in the AP adds redundancy bits produced by the SC encoder to data payload bits of a frame, and passes the payload plus redundancy bits to the underlying WLAN MAC layer. The redundancy is needed to complete the payload size to a multiple number of SC code words.

In some embodiments, the AP comprises an encoder handler (not shown) that feeds input bits to SC encoder 160, and sends bits of the SC code words produced by the SC encoder to the AP MAC module. In some embodiments, the number of input bits for the SC encoder differs from the number of bits required for producing a single SC code word. For example, the encoder handler may buffer a number of input bits for encoding that corresponds to producing two or more SC code words by the SC encoder. In addition, the encoder handler fragments one or more SC code words to chunks whose size is supported by the AP MAC module.

In an example embodiment, SC encoder 160 encodes a number of 409 input bits into a SC code word of 1024 bits. An IP packet of 1500 Bytes is therefore encoded by this SC encoder into 3756 Bytes, which amounts to a number of $(3756 \cdot 8)/1024=29.3$ SC code words. The encoder handler feeds the SC encoder with the 1500 bytes to be encoded into 30 SC code words (3840 Bytes), and pads a number of 139 bits to the 1500 Bytes complete the missing 0.66 of the input bits required for producing the last code word.

The SC encoder (or the encoder handler) pads the input bits for generating the last SC code word with random (or pseudorandom) bits that are unknown to any potential eavesdropper, so as not to compromise secrecy. In case the underlying AP MAC module cannot handle frames of 3756 Bytes, the encoder handler fragments the frame into chunks whose size is supported by the AP MAC module.

In some embodiments, the usage of the SC scheme (together with transmitting jamming data streams by the AP) is confined to data streams of low bandwidth and/or latency demands. For example, applications such as banking, monetary and Internet of Things (IoT), usually require very high security level (sematic secrecy level) but have relaxed requirements in terms of bandwidth and latency. In such embodiments, at least outer encoder 170 and outer decoder 178 are implemented in software, e.g., as part of a WiFi driver or at an application layer.

At the client device side, SC decoder 164 decodes the received code word to recover the original bits. The implementation of the SC decoder is typically more complex than the implementation of the SC encoder. In various applications, the client device comprises a mobile terminal that is typically required to consume minimal power. In such cases, the SC scheme can be applied selectively, e.g., only to data streams having low bandwidth requirements.

In some embodiments, the SC decoder at the client device side (STA) is implemented at the same layer as the SC encoder in the AP side. For example, both SC encoder and SC decoder are implemented as part of the application layer or the WiFi driver.

ADDITIONAL IMPLEMENTATION CONSIDERATIONS

In the method of FIG. 4, described above, the AP and STA cyclically exchange updated secret keys KEY1 and KEY2. In this embodiment, the usage of an updated key should be synchronized between the AP and STA. For example, the AP transmits KEY1 to the STA over a protected downlink channel, but the STA may be ready to use this KEY1 for encrypting uplink frames only after some time delay, which may depend on various implementation factors. For example, in some embodiments, KEY1 is encoded using a SC scheme, and requires SC decoding at the STA. The time delay in this case is typically much longer compared to protecting the downlink transmission using AN without SC. As another example, the time delay depends on whether the SC scheme is implemented in hardware at the MAC layer, or in software at a higher layer.

In an embodiment, the AP tags a data stream or a packet for signaling to the AP MAC module and/or to the AP PHY module a suitable time for transmitting the jamming streams.

In some embodiments, the AP assigns a respective tag to each instance of KEY1 sent to the STA. In response to receiving a tagged KEY1, the STA sends to the AP a notification indicating the first frame from which the STA will start to encrypt frames using the recently received tagged KEY1. In an embodiment, the AP indicates this first frame based on sequence numbers assigned to the respective frames. In the opposite direction, the STA sends a tagged KEY2 to the AP, which signals to the STA the first frame that the AP will encrypt using KEY2.

The AP typically organizes the data streams for transmission in frames that comprise a header part and a payload part. Depending on the underlying protocols used, some fields in the frame carry known or easy to guess values. For example, WiFi frames (in accordance with the IEEE 802.11 family of standards) start with a known preamble that uses, e.g., for synchronization. In addition, one or more fields in the MAC header, and possibly a frame delimiter in the payload part of the frame may have known or easy to guess values.

In some embodiments, the AP schedules the transmission of the jamming streams so as to avoid transmitting the jamming streams in parallel to transmitting known or easy to guess fields within the data streams. Although transmitting the jamming streams in parallel to the MAC header could be effective against a naïve eavesdropper receiver, a highly sensitive and sophisticated eavesdropper receiver could gain knowledge of the transmitted noise, based on the known fields, and use this knowledge for suppressing the interfering noise, e.g., using directional reception techniques.

In some embodiments, the AP schedules the transmission of the jamming streams only in parallel to the payload part following the MAC header. In such embodiments, SC encoding is also applied to the payload part following the MAC header.

In some embodiments, the AP applies the jamming streams synchronized to OFDM symbol boundaries. In such embodiments, since the MAC header is not necessarily synchronized to the OFDM symbol boundaries, the AP extends the MAC header with padding bits to be aligned with the far boundary of the relevant OFDM symbol. The number of padding bits depends on the used Modulation and Coding Scheme (MCS). The addition of the padding bits to the MAC header can be performed at the MAC layer or at a higher layer. In case the SC is applied by the application layer, the MCS with which a frame will be transmitted is typically unknown, and therefore a sufficiently number of pad bits should be generated in advance.

As described above, in some embodiments, to encrypt a message, the STA bitwise XORs the OTP bits with the message bits. In such embodiments, the stream cipher at the STA can be implemented at a level higher than the MAC level. Alternatively, the STA stream cipher is implemented at the MAC level, in which case header bits and protocol related bits of the message are encrypted as well. Implementing the STA stream cipher at the MAC level may require modifications to the underlying hardware since such an implementation breaks the underlying IEEE 802.11 protocol.

The embodiments described above are given by way of example, and other suitable embodiments can also be used. For example, although the embodiments described above refer mainly to a WLAN such as WiFi, the disclosed techniques are applicable mutatis mutandis to other suitable wireless communication networks and protocols such as Long Term Evolution (LTE) networks.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a Base Station (BS), comprising:
an antenna array, configured to transmit downlink transmissions, and to receive uplink transmissions; and
circuitry, configured to:
estimate, for one or more legitimate user devices, respective numbers of secret bits required for securing respective uplink transmissions of the legitimate user devices, by receiving from each legitimate user device a Buffer Status Report (BSR) that indicates a status of an outgoing queue of the legitimate user device;

Generate, based on the estimated numbers of the secret bits, secret bits to be used for securing uplink transmissions from the legitimate user devices, and distribute the secret bits over one or more data streams destined to the legitimate user devices;

generate one or more jamming streams, and apply to the jamming streams beamforming that directs the jamming streams away from the legitimate user devices;

transmit the data streams and the jamming streams using the antenna array; and receive, via the antenna array, data that was encrypted by a legitimate user device based on the secret bits, and recover the data by decoding the encrypted data using the secret bits.

2. The apparatus according to claim 1, and comprising a user device, which is configured to receive the data streams from the BS, to recover from the data streams secret bits destined to the user device, to encrypt data intended to the BS using the recovered secret bits, and to transmit the encrypted data to the BS using one or more antennas.

3. The apparatus according to claim 2, wherein the secret bits comprise a One Time Pad (OTP) bit-sequence, wherein the user device is configured to encrypt the data by applying a bitwise XOR operation between the data and the OTP bit-sequence.

4. The apparatus according to claim 2, wherein the secret bits comprise a seed, and wherein the user device is configured to use the seed for generating a pseudorandom sequence for encrypting the data using a stream cipher.

5. The apparatus according to claim 2, wherein the data intended to the BS comprises a secret key, wherein the BS uses the secret key to encrypt information to be transmitted to the user device originating the secret key.

6. The apparatus according to claim 2, wherein the BS is configured to generate updated secret bits and to transmit the updated secret bits to the user device over the data streams, and wherein the user device is configured to recover the updated secret bits from the data streams, and to encrypt subsequent data intended to the BS using the updated secret bits.

7. The apparatus according to claim 1, wherein the circuitry is configured to encode the secret bits using a Secrecy Coding (SC) scheme.

8. The apparatus according to claim 7, wherein the SC scheme comprises an outer code followed by an inner code comprising a Forward Error Correction (FEC) code.

9. The apparatus according to claim 8, wherein the outer code comprises a Polar code or a Reed Muller code.

10. A method for communication, comprising:
in a Base Station (BS) that comprises an antenna array, estimating for one or more legitimate user devices, respective numbers of secret bits required for securing respective uplink transmissions of the legitimate user devices, by receiving from each legitimate user device a Buffer Status Report (BSR) that indicates a status of an outgoing queue of the legitimate user device;

generating, based on the estimated numbers of the secret bits, secret bits to be used for securing uplink transmissions from the legitimate user devices, and distributing the secret bits over one or more data streams destined to the legitimate user devices;

generating one or more jamming streams, and applying to the jamming streams beamforming that directs the jamming streams away from the legitimate user devices;

transmitting the data streams and the jamming streams using the antenna array; and receiving, via the antenna array, data that was encrypted by a legitimate user device based on the secret bits, and recovering the data by decoding the encrypted data using the secret bits.

11. The method according to claim 10, and comprising receiving the data streams from the BS by a user device, and recovering from the data streams secret bits destined to the user device, encrypting data intended to the BS using the recovered secret bits, and transmitting, by the user device, the encrypted data to the BS using one or more antennas.

12. The method according to claim 11, wherein the secret bits comprise a One Time Pad (OTP) bit-sequence, and wherein encrypting the data comprises applying a bitwise XOR operation between the data and the OTP bit-sequence.

13. The method according to claim 11, wherein the secret bits comprise a seed, and comprising generating from the seed a pseudorandom sequence for encrypting the data using a stream cipher.

14. The method according to claim 11, wherein the data intended to the BS comprises a secret key, and comprising encrypting, using the secret key, information to be transmitted by the BS to the user device originating the secret key.

15. The method according to claim 11, and comprising generating by the BS updated secret bits and transmitting the updated secret bits to the user device over the data streams, recovering, by the user device, the updated secret bits from the data streams, and encrypting subsequent data intended to the BS using the updated secret bits.

16. The method according to claim 10, and comprising encoding the secret bits using a Secrecy Coding (SC) scheme.

17. The method according to claim 16, wherein the SC scheme comprises an outer code followed by an inner code comprising a Forward Error Correction (FEC) code.

18. The method according to claim 17, wherein the outer code comprises a Polar code or a Reed Muller code.

* * * * *